United States Patent
Simmons

(10) Patent No.: US 7,784,400 B2
(45) Date of Patent: Aug. 31, 2010

(54) DUCKBILL CAM GEOMETRY FOR REDUCED ACTUATION FORCES

(75) Inventor: Scott C. Simmons, Lititz, PA (US)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 12/346,375

(22) Filed: Dec. 30, 2008

(65) Prior Publication Data

US 2010/0162676 A1 Jul. 1, 2010

(51) Int. Cl.
*B30B 5/04* (2006.01)
*B65B 11/56* (2006.01)

(52) U.S. Cl. .............................. 100/87; 100/88; 53/118; 53/587; 53/389.3

(58) Field of Classification Search .................... 100/17, 100/19 R, 24, 87, 88, 89; 56/341; 53/118, 53/211, 389.3, 556, 587
See application file for complete search history.

(56) References Cited

U.S. PATENT DOCUMENTS

| | | | |
|---|---|---|---|
| 1,437,921 A | 12/1922 | Stobie | |
| 2,417,309 A | 3/1947 | Lisle et al. | |
| 4,517,891 A | 5/1985 | Henry | |
| 5,036,642 A * | 8/1991 | Underhill | 53/118 |
| 5,289,672 A * | 3/1994 | Underhill | 53/587 |
| 5,467,702 A | 11/1995 | Naaktgeboren et al. | |
| 5,557,906 A * | 9/1996 | Viaud | 53/118 |
| 6,021,622 A * | 2/2000 | Underhill | 53/118 |
| 6,070,403 A | 6/2000 | Hawlas | |
| 7,513,088 B2 * | 4/2009 | Vande Ryse | 53/118 |
| 2006/0242931 A1 | 11/2006 | Ryse | |
| 2008/0092756 A1 | 4/2008 | Vande Ryse | |

FOREIGN PATENT DOCUMENTS

| | | |
|---|---|---|
| EP | 001493326 A1 | 1/2005 |
| JP | 02004201564 A | 7/2004 |
| WO | 003000552 A1 | 1/2003 |

* cited by examiner

*Primary Examiner*—Jimmy T Nguyen
(74) *Attorney, Agent, or Firm*—Patrick M. Sheldrake; John William Stader; Michael G. Harms

(57) ABSTRACT

An improved mechanism for directing the motion of a knife mechanism in a bale wrapping apparatus which reduces actuation and acceleration forces in the knife mechanism thereby improving operational efficiency and durability of the mechanism and actuator.

12 Claims, 3 Drawing Sheets

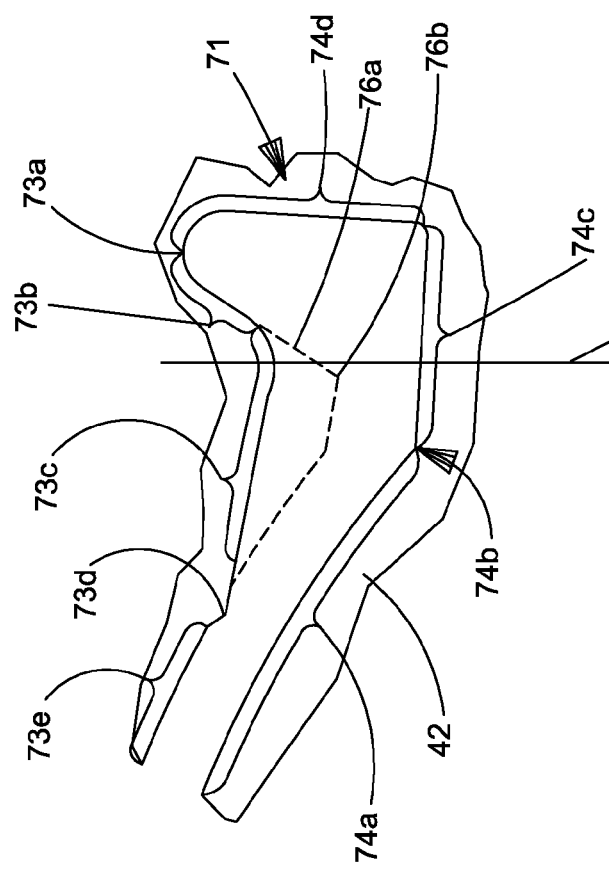
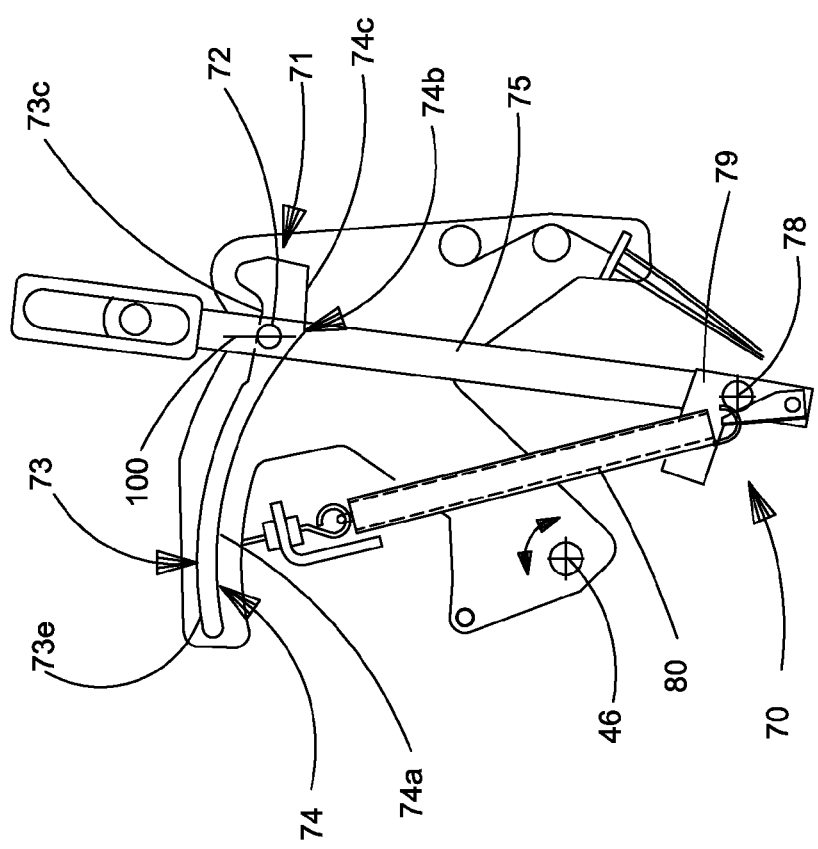

DUCKBILL CAM GEOMETRY FOR REDUCED ACTUATION FORCES

BACKGROUND OF THE INVENTION

The present invention relates generally to agricultural baling machines and more particularly to a baler for producing cylindrical bales, commonly referred to as round bales, having an improved wrapping apparatus for wrapping round bales of crop material formed in a bale forming chamber that reduces operating forces in the apparatus to improve durability.

Round balers generally have a bale forming chamber defined by a pair of opposing side walls associated with an array of side-by-side belts, transverse slats trained on chains, a plurality of transverse rolls or a combination of these various elements, e.g., rolls and belts. During field operation, windrowed crop material such as hay is picked up from the ground and fed in a continuous stream into a fixed or variable diameter chamber. The hay is rolled into a cylindrical package within the chamber, wrapped with twine, net or the like and ejected onto the ground for subsequent handling.

U.S. Pat. No. 5,289,672 and U.S. Pat. No. 4,956,968, issued to Underhill, disclose prior art round balers having a wrapping apparatus of the general nature described above. In this particular type of baler an expandable chamber is defined by a pair of fixed sidewalls, and a plurality of side-by-side belts cooperating with a series of transverse rolls, mounted between a pair of pivotally mounted arms. This arrangement of rolls and arms is commonly referred to as a sledge assembly. The chamber includes an inlet opening in the front through which crop material is fed. Also included is a pair of take up arms pivotally mounted on the main frame, between which arms a pair of guide rolls are journalled. A biasing force on the take up arms urges the outer surfaces of the guide rolls against the belts to maintain tension and thereby prevent slack from occurring in the belts during expansion and contraction of the chamber. Density of the bale can be affected by varying the force on the take up arms.

The present invention relates to an improvement in the wrapping system for round balers in which cylindrical packages of crop material (bale) are formed in a fixed or expanding chamber wherein one or more transverse forming rollers are employed. In such designs, a supply of wrapping material is typically dispensed from a supply area in the baler housing into the bale forming chamber through the space between two of the transverse rolls whereupon the wrapping material comes into contact with and adheres to the outer surface of the bale as it is rotated by the rolls. The wrapping system includes a wrapper insertion assembly which is pivotally connected to the baler and moved by an actuator. The insertion assembly is pivoted to move into a space between the two transverse rolls while gripping a free end of the wrapping material to feed the free end into the bale forming chamber and initiate the wrapping process. Once the wrapping material is engaged by the bale, the insertion mechanism is partially withdrawn as the bale is wrapped. Once the bale is completely wrapped, the insertion assembly is fully withdrawn and the wrapping material is severed from the supply.

Movement of a knife in the wrapping apparatus is coordinated by an interconnecting linkage whereby movement of the insertion mechanism positions the knife to sever the wrapping material at the appropriate time in the wrapping cycle. As the insertion mechanism pivots toward the wrapper insertion position, a cam in the mechanism guides a cam follower; a connected linkage actuates the knife, first moving it to a pre-cut position which stretches a spring to provide the cutting force and positions the knife linkage to restrain the knife against the spring force. As the insertion mechanism is fully withdrawn, the cam releases the knife and the spring moves the knife to sever the wrapping material.

The interconnecting linkage may be subjected to relatively high wear rates resulting from intermittent application of the relatively high forces necessary to coordinate motion of the knife, especially at the interface between the cam and the cam follower. Over time, the performance of the insertion mechanism and/or actuator may degrade as a result. It would be desirable to provide an improved mechanism that reduces operating forces in the wrapper insertion mechanism thereby improving the operational lifespan of the bale wrapping mechanism.

SUMMARY OF THE INVENTION

Accordingly, the present invention, in any of the embodiments described herein, may provide one or more of the following advantages:

It is an object of the present invention to provide an improved mechanism for controlling the bale wrapping process on a round baler that reduces the operating forces on the mechanism and actuator in order to improve performance and durability.

It is a further object of the present invention to provide an improved mechanism for controlling the bale wrapping process on a round baler that reduces acceleration rates within discreet portions of the mechanism in order to reduce operating forces within the mechanism.

It is a further object of the present invention to provide an improved mechanism for controlling the bale wrapping process on a round baler that improves mechanical efficiency thereby decreasing the force input requirement for operating the mechanism.

It is a further object of the present invention to provide an improved mechanism for managing the movement of a bale wrapping apparatus that provides smoother and faster operation of the apparatus thereby resulting in a more economical baler wrapping system operation.

It is a still further object of the present invention to provide an improved mechanical mechanism for directing the movements of a wrapping knife mechanism in a bale wrapping apparatus that is easily adaptable for use on a standard round baler design thereby enabling efficient manufacturing of a variety of baler models employing similar wrapping apparatus designs.

It is a still further object of the present invention to provide an improved mechanism for controlling the movements of a bale wrapping apparatus in a round baler that is durable in construction, inexpensive of manufacture, carefree of maintenance, easily assembled, and simple and effective to use.

These and other objects are achieved according to the instant invention by providing an improved mechanism for directing motion of a knife mechanism in a bale wrapping apparatus which reduces acceleration forces in the knife mechanism thereby improving operational efficiency and durability.

BRIEF DESCRIPTION OF THE DRAWINGS

The advantages of this invention will be apparent upon consideration of the following detailed disclosure of the invention, especially when taken in conjunction with the accompanying drawings wherein:

FIG. 4 is a detail view of the bale wrapping apparatus showing the improvement in the cam profile; and FIG. 5 is a detail view of one embodiment of the improved cam of the present invention illustrating the revised arming profile.

DESCRIPTION OF THE PREFERRED EMBODIMENT(S)

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "left" or "right" are used as a matter of mere convenience, and are determined by standing at the rear of the machine facing in its normal direction of travel. Likewise, "forward" and "rearward" are determined by the normal direction of travel. "Upward" and "downward" orientations are relative to the ground or operating surface as are any references to "horizontal" or "vertical" planes. Furthermore, the various components shown or described herein for any specific application of this invention can be varied or altered as anticipated by this invention and the practice of a specific application of any element may already be widely known or used in the art by persons skilled in the art and each will likewise not therefore be discussed in significant detail. When referring to the figures, like parts are numbered the same in all of the figures.

Figure 1:
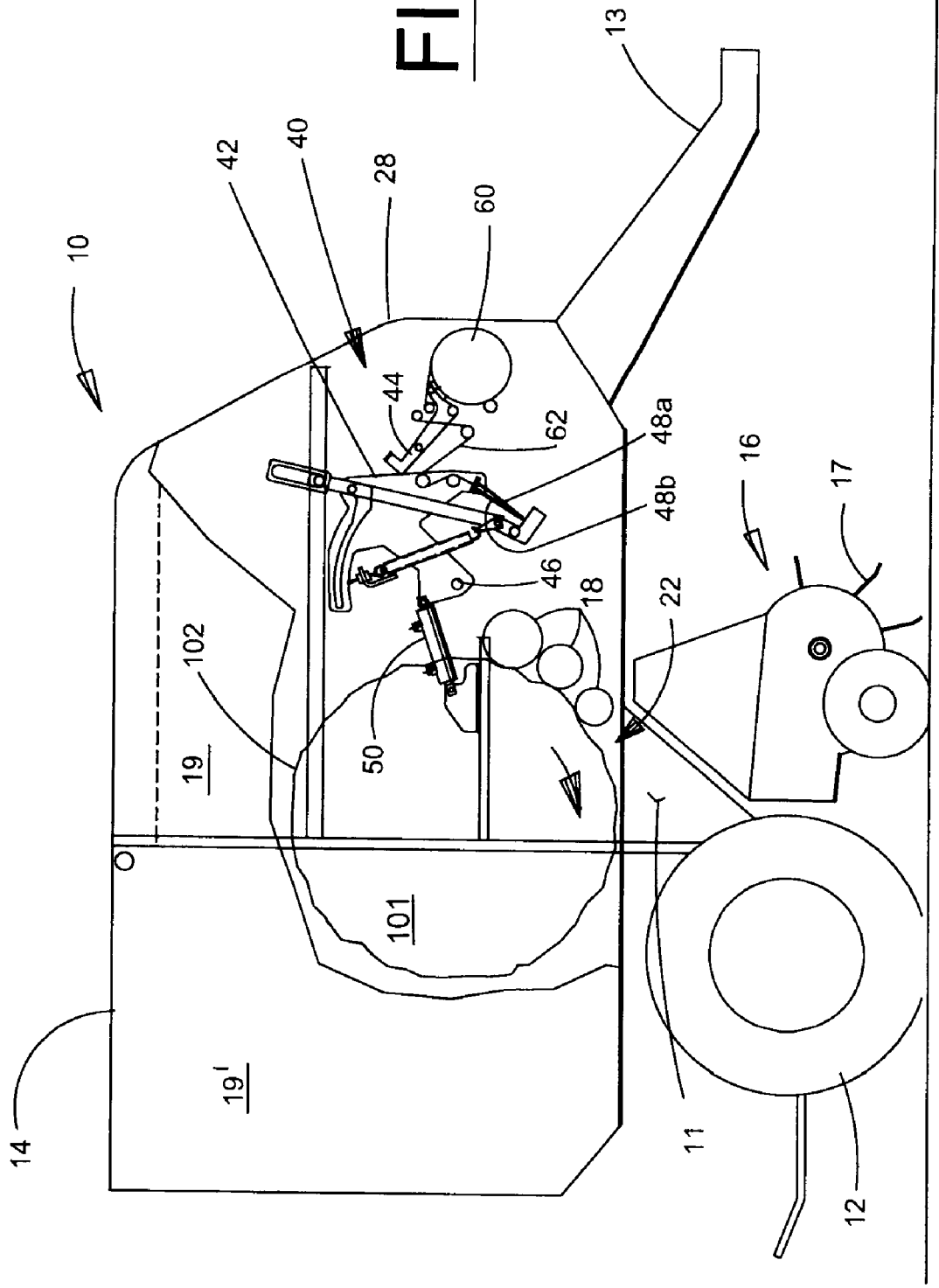
FIG. 1 is a cross sectional diagrammatic side elevation view of a typical agricultural round baler of the type on which the present invention is useful in which the tailgate is in the closed position and the elements of the bale forming chamber are shown in a near-full bale forming condition.

Referring to the drawings for a detailed description of the preferred embodiment of the invention, FIG. 1 shows the cross section of a round baler 10 of the type in which the present invention is readily embodied. Baler 10 has an expandable bale forming chamber defined in part by belts and rolls. This type of expandable chamber is disclosed in various prior art patents, e.g., U.S. Pat. No. 4,956,968 mentioned above, which is hereby incorporated by reference. It should be noted that throughout this description the drawings are diagrammatic in nature to best show the elements of the baler in which the invention is embodied. To this end, in many instances only one element in a pair is shown, especially in those cases where identical elements exist, disposed on opposing sides of the baler, e.g., wheels.

Baler 10 has a main frame 11, comprising a plurality of rigid structural elements including a pair of side walls 19 (only one shown). Main frame 11 is supported by a pair of wheels 12 (also only one shown). A forwardly mounted tongue 13, integral with main frame 11, provides for connection to a tractor. Pivotally connected to side walls 19 is a tailgate 14 which is closed during bale formation. Tailgate 14 includes walls 19' coplanar with side walls 19. The main frame 11 supports a series of movable belts (not shown) and rolls 18 which together with the opposing sidewalls 19 establish an expandable bale-forming chamber 22. Other combinations of belts, rollers, and/or pulleys are also known as methods for defining the bale forming chamber and are contemplated within the scope of this invention. A pickup 16, mounted on main frame 11, has a plurality of tines 17, the tips of which are movable along a predetermined path to lift crop material from the ground and deliver it rearwardly along a generally horizontal path toward the bale forming chamber 22 where it is formed into a cylindrically shaped bale 101 by movement of the belts and rolls connected to a movable sledge.

A completed bale, that is one that has reached a desired diameter, is then wrapped with twine or a wrapping material dispensed from the wrapping apparatus 40, to maintain the bale shape after ejection from the baler. The wrapping apparatus 40 is positioned generally behind forward shield 28 of the baler housing. Upon completion of the wrapping process, the tailgate 14 pivots upwardly to open the rearward portion of the bale forming chamber and the bale 101 is ejected onto the ground. Exemplary prior art wrapping mechanisms are shown in U.S. Pat. Nos. 5,289,672 and 6,021,622, both by Underhill, the descriptive portions of which are incorporated herein by reference.

With the above description and general operation of baler 10 as a background, attention will now be directed to the wrapping apparatus 40 shown. As will become apparent, the wrapping apparatus 40 of baler 10 is merely illustrative of one of the many types to which the features of the present invention are adaptable. For example, although a net wrapping system is shown, utilization of plastic wrap or twine would have no affect on the general aspects of the present invention.

Figure 3:
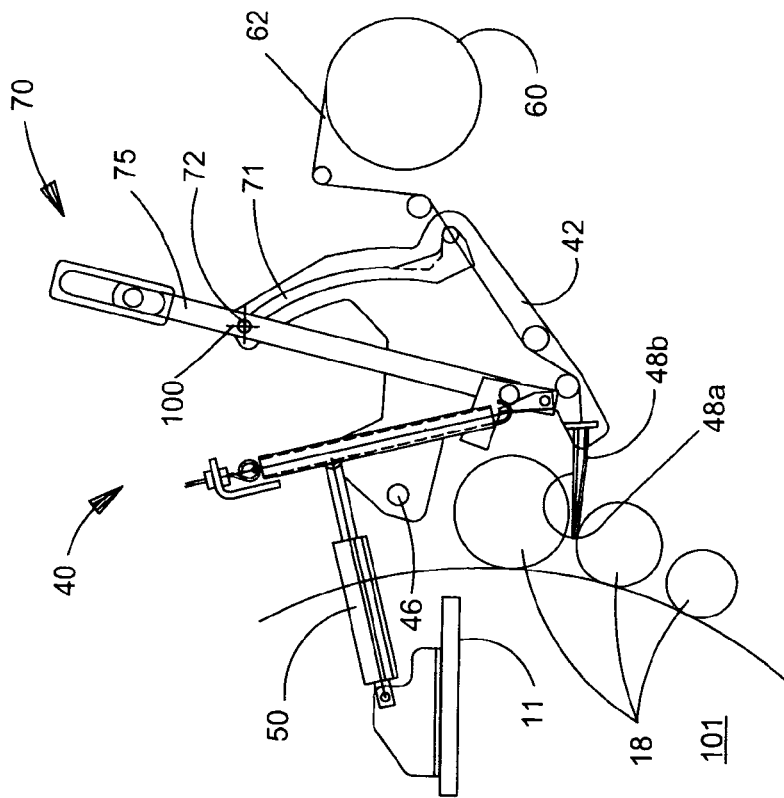
FIG. 3 is a partial side view of the bale wrapping apparatus of FIG. 2 shown in a second or inserted position.
Figure 2:
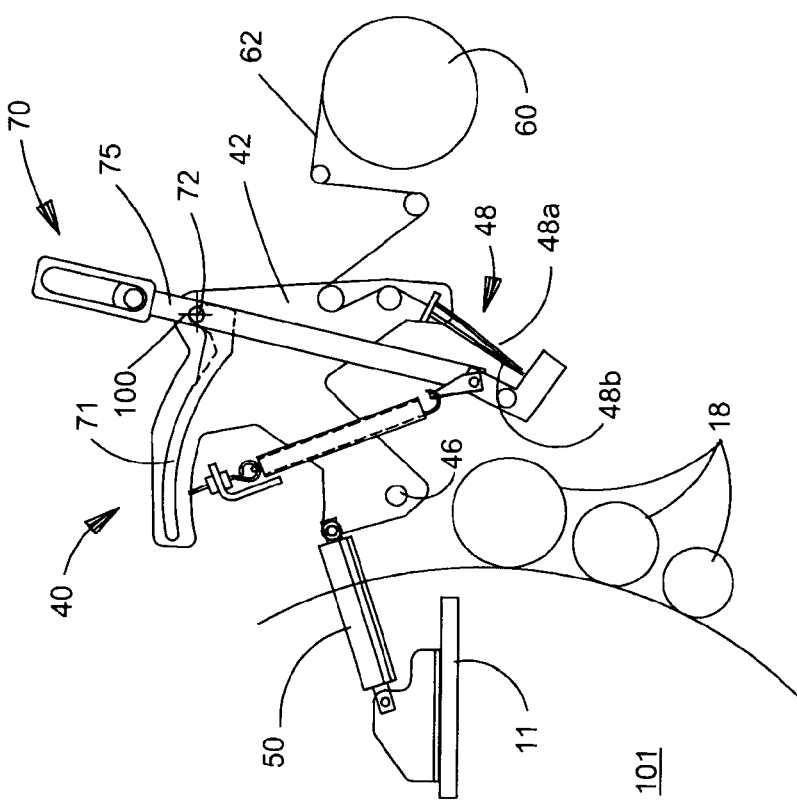
FIG. 2 is a partial side view of the bale wrapping apparatus of the agricultural round baler of FIG. 1 in which the bale wrapping apparatus is shown in a first or home position.

Now turning to FIGS. 2 and 3, with reference back to FIG. 1, wherein the relationship of the various elements and assemblies of the bale forming chamber are shown. The wrapping apparatus 40 is shown to more particularly comprise an insertion mechanism 42 and a material dispenser 44. Insertion mechanism 42 is pivotally connected to the chassis at pivot point 46 thereby enabling the mechanism to move between generally opposing retracted (home) and inserted positions. Wrapping material dispenser 44 includes a material supply 60, typically in the form of a continuous roll which is fed through the insertion mechanism 42 for application on the bale 101. Movement of insertion mechanism 42 is accomplished by an actuator 50 which interconnects the baler structure and the movable insertion mechanism 42 to cause pivotal movement about pivot point 46. As the bale is being formed in the bale chamber, the insertion mechanism 42 is fully withdrawn by actuator 50 to the inactive retracted position, shown in FIG. 2. Movement of insertion mechanism 42 into the inserted position, shown in FIG. 3, allows a pair of transversely extending wrapping clamp members 48a, 48b to position the wrapping material 62 held therebetween in contact with the outer circumference 102 of the bale in the bale forming chamber whereupon the wrapping material 62 adheres to the bale and is wrapped around the bale as it is rotated within the bale forming chamber. Because of their appearance, the clamping members 48a, 48b being movable at an end of insertion mechanism 42 is commonly collectively referred to as the duckbill 48, and will be hereinafter for convenience.

As the bale is formed and a full chamber condition is reached, it is wrapped before being ejected from the baler. Finished bale size is generally sensed by monitoring the position of the rolls defining the bale forming chamber or some portion of the belt take up mechanism. The insertion mechanism 42 is then moved from a normal or home position (shown in FIG. 2) to a fully inserted position (shown in FIG. 3) in order to position the wrapping material so that it will contact the outer circumference of the rotating bale 101 and begin to wrap around the bale. Movement of the insertion mechanism to the fully inserted position also arms the knife mechanism 70 so that it is prepared to sever the wrapping material applied to the bale from the wrapping supply at the appropriate time. The insertion mechanism 42 is retracted slightly to an intermediate position, also known as the pre-cut position, once the wrapping material begins to feed and is held stationary in that position while the wrapping occurs. Upon completion of the wrapping, the insertion mechanism 42 is fully withdrawn from the bale chamber. Retraction movement of the insertion mechanism from the pre-cut to the home position triggers knife mechanism 70, causing a knife blade integrated in the mechanism to cut the wrapping material 62 being fed from a dispenser 60 thereby separating the wrapping material in the dispenser from the wrapping material on the bale. The free end of the wrapping material 62 being fed from the dispenser is held in position by clamping members 48a, 48b in anticipation of the next wrapping cycle. The bale 101 is discharged from the baler and the wrapping apparatus is left in the fully withdrawn position for the next bale.

Now referring to FIGS. 4 and 5 in connection with FIGS. 2 and 3, movement of the knife mechanism 70 is coordinated with and controlled by movement of the insertion mechanism 42 by an elongate, generally L-shaped groove cam 71 which is connected to or integral with the insertion mechanism 42 such that it pivots therewith. Cam follower 72 is configured to conform to the profile of the groove cam as it moves past the cam follower. Cam follower 72 is connected to the baled in a manner to limit movement to bi-directional motion along a single translational axis 100. Linkage 75 interconnects the cam follower and the knife mechanism to transfer motion of the cam follower to the knife mechanism. Movement of the knife mechanism 70 is controlled between a normal position and an armed position.

The groove cam 71 comprises a continuous internal bearing surface with an arming profile 73 and a releasing profile 74 disposed generally opposite to the arming profile. Cam follower 72 engages and conforms to arming profile 73 as the insertion mechanism 42 is moved from the home position toward the inserted position. Movement of the cam follower 42 along the arming profile repositions knife mechanism 71 from the normal position to the armed position. During the knife arming process, linkage 75 is moved downwardly by the cam follower 72 thereby causing rocker arm 79 to pivot clockwise about pin connection 78. Downward movement of linkage 75 and pivotal motion of rocker arm 79 is resisted by elongation of spring 80. As the cam follower reaches the arming point 73d on the arming profile 73, the rocker arm has been sufficiently pivoted to result in an over-center retention force being applied by spring 80 which moves the rocker arm 79 into a position to resist the spring force and hold the knife mechanism 70 in place against the spring force. At this point, the knife mechanism is armed and ready for release for wrapping material severing. Reversing the direction of motion of the insertion mechanism 42 causes cam follower 42 to engage the releasing profile 74 which, as the insertion mechanism is retracted past the pre-cut position, trips the knife mechanism by pivoting rocker arm 79 counter-clockwise slightly thus allowing the spring force to move the knife mechanism from the armed to the normal position and sever the wrapping material. The contour of knife cam in the zone between trigger point 74b and the initial position 73a allows substantially unrestrained upward movement of the linkage 75 so that severing of the wrapping material occurs quickly.

As insertion mechanism 42 is pivoted from the home position (shown in FIG. 2) toward the insert position (shown in FIG. 3), cam follower 72 engages the arming profile 73 of the cam. Beginning with cam follower 72 in an initial position 73a, corresponding to the home position of insertion mechanism 42), the follower first encounters initial ramp 73b as the insertion mechanism begins pivoting toward the insert position. Initial ramp 73b quickly repositions the knife mechanism 70 to avoid interference with the insertion mechanism. Prior art cams simply continued along the same general profile, illustrated as known profile 76a in FIG. 5, which maintained the initially high rate of knife mechanism movement established by initial ramp 73b until the knife mechanism reached the armed position corresponding to known arming point 76b. This position on the arming profile generally corresponded to the pre-cut position of the insertion mechanism. However, such rapid movement of the knife mechanism imposed large operating stresses on the knife mechanism and the insertion mechanism actuator which resulted in an increased incidence of operational failures.

The improvement of the present invention optimizes the rate of movement of the knife mechanism during the arming process by re-contouring a portion of arming profile 73 of the cam bearing surface to extending the pivoting motion of the insertion mechanism needed to achieve the armed position of the knife mechanism 70. This improvement is best illustrated in FIG. 5 by comparing the relative locations of the improved arming profile 73c of the present invention and the known arming profile 76a (shown in FIG. 5 as a dashed-line cam contour). Comparing the relative positions of the known arming point 76b with the improved arming point 73d reveals that the improved cam arming profile requires greater pivotal movement of the insertion mechanism 42 to arm the knife mechanism. As the insertion mechanism 42 is pivoted, the rate at which the knife mechanism is moved to reach the fully armed position is more gradual (lower rates of motion) when the cam follower 42 follows the improved arming portion 73c compared to the mechanism velocities and accelerations produced when armed using the known arming profile 76a. The result of this optimized cam profile is a more gradual knife mechanism throughout the arming process (movement of the cam follower along the improved arming portion 73c of the arming portion of the cam), and a reduction in the operating stresses imposed on the cam arming profile 73, the cam follower 42, and the knife mechanism 70. Reduced operating stresses yield decreased wear and tear on the actuator 80, knife cam 71, cam follower 72 the linkage connection points and thus increased life for these components. The resulting reduction in the actuator force required to arm the knife mechanism also improves operation of the knife mechanism itself and the entire wrapping material insertion mechanism which is repositioned by the actuator.

With the knife mechanism positioned in the armed position (corresponding to improved arming point 73d), continued movement of the insertion mechanism toward the fully inserted position causes cam follower 72 to engage a first idle portion 73e of the cam bearing surface which results in no significant vertical movement of the cam follower 72. Reversing the direction of insertion mechanism movement (withdrawing) causes the cam follower to engage a second idle portion 74a of the cam bearing surface. First and second idle portions are arranged generally uniformly spaced apart along their length to constrain the cam follower 72 in a generally fixed position along translational axis 100 as the insertion mechanism pivots. When the insertion mechanism is retracted to the pre-cut position (corresponding to point 74b on the releasing profile), cam follower 72 engages the trigger portion 74c of the cam bearing surface. Trigger portion 74c causes the cam follower to be moved upwardly along translational axis 100 to release the knife and sever the wrapping material. During the knife movement, cam follower 72 is rapidly moved by the force of spring 80 along cutting portion 74*d* until the cam follower 72 reaches the home position 73*a*.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. In an agricultural round baler having a bale forming chamber defined by movable belts in contact with a plurality of rollers and/or pulleys disposed in a space between two opposing side walls, and a wrapping apparatus for selectively applying a dispenser-supplied elongate wrapping material to the exterior of a completed bale, the improvement comprising:
   an insertion mechanism for directing the wrapping material from the dispenser into the bale forming chamber, said insertion mechanism being pivotally connected to the baler and selectively positionable between a home position and a generally opposing insert position;
   a knife mechanism for severing the wrapping material from the dispenser, said knife mechanism movable between at least a cutting position and an armed pre-cut position, movement of said knife mechanism coordinated with movement of said insertion mechanism;
   a cam follower disposed on the baler and constrained for bi-directional movement along a single axis;
   an elongate link member having a first end connected to said knife mechanism and a second end connected to said cam follower;
   a groove cam disposed on said insertion mechanism for movement therewith, said groove cam comprising an arming profile configured to be engaged by said cam follower to coordinate movement of said knife mechanism with movement of said insertion mechanism wherein said arming profile is configured to reduce the rate of said knife mechanism movement as it is moved from said cut position to said armed pre-cut position, and to reduce the relative rate of movement of said knife mechanism relative to the degree of pivotal movement of said insertion mechanism from said home position toward said insert position; and
   said groove cam further comprises, a first arming profile, a second arming profile, and a transition point, said cam follower encountering said first arming profile, said second arming profile, and said transition point serially as said insertion mechanism is pivoted from said home position toward said insert position, said knife mechanism being positioned in said armed pre-cut position when said follower reaches said transition point, said knife mechanism moving at a first rate when said cam follower engages said first arming profile and moving at a second rate when said cam follower engages said second arming profile wherein said first rate is greater than said second rate.

2. The improvement of claim 1, wherein said knife mechanism further comprises a rocker arm pivotally connected to the baler and movable between an armed position and a normal position, and a spring for biasing said rocker arm toward said normal position, said rocker arm being moved toward said armed position by movement of said cam follower along said arming profile toward said intermediate position at which point said rocker arm is held stationary by an over-center arrangement in said pivotal connection to the baler.

3. The improvement of claim 2, further comprising an actuator for pivoting said insertion mechanism, said arming profile contoured to minimize actuator force required to move said knife mechanism toward said armed pre-cut position.

4. A cam for managing the position of a knife mechanism in a bale wrapping apparatus on an agricultural round baler, the cam comprising:
   an insertion mechanism for directing the wrapping material from a dispenser onto the bale, said insertion mechanism pivotally coupled to the baler and movable between generally opposing first and second positions, and positionable in a pre-cut position located between said first and second positions;
   a knife for severing the wrapping material from said dispenser, said knife movable between at least an armed position and a released position, movement of said knife being coordinated with movement of said insertion mechanism;
   an elongate groove cam having a continuous bearing surface, said groove cam connected to said insertion mechanism for movement therewith, said bearing surface further comprising an first arming portion, a second arming portion and a releasing portion;
   a cam follower disposed for contact with said continuous bearing surface and constrained for bi-directional movement along a single axis; and
   a linkage interconnecting said knife and said cam follower, said linkage coordinating movement of said knife with movement of said insertion mechanism whereby said cam follower serially engages said first and second arming portions during movement of said insertion mechanism from said first position toward said second position, moving said knife to said armed position at a first rate while said cam follower is engaged on said first arming portion, a second rate while said cam follower is engaged on said second arming portion, and where said first rate of movement is greater than said second rate of movement.

5. The cam of claim 4, wherein said groove cam is configured to maintain said linkage in a generally stationary position with respect to said baler as said insertion mechanism is pivoted between said pre-cut position and said second position.

6. The cam of claim 5, wherein said groove cam further comprises a releasing portion, said releasing portion configured to be engaged by said cam follower as said insertion mechanism is pivoted from said second position toward said first position and causing, at a pre-determined position of said insertion mechanism, said knife to be moved from said armed position to said released position, thereby severing the wrapping material.

7. The cam of claim 6, wherein said groove cam is generally L-shaped and said arming portion and said releasing portion are generally opposed to one another.

8. The cam of claim 7, wherein said knife further comprises a rocker mechanism pivotally connected to the baler and movable between an armed position and a normal position, a spring for biasing said rocker mechanism toward said normal position, said rocker mechanism being moved toward said armed position by movement of said cam follower along said arming portion toward said pre-determined position at which point said rocker mechanism is held stationary by an over-center arrangement in said pivotal connection, said rocker mechanism being released and allowed to move toward said normal position by contact between said cam follower and said releasing portion.

9. The cam of claim 8, further comprising an actuator for pivoting said insertion mechanism, and wherein said second arming portion of said arming profile is contoured to minimize actuator force required position said knife in said armed position.

10. A cam for managing the position of a knife mechanism in a bale wrapping apparatus on an agricultural round baler, the baler having a bale-forming chamber defined by movable belts in contact with a plurality of rollers and/or pulleys disposed in a space between two opposing side walls, the bale wrapping apparatus for selectively applying a dispenser-supplied elongate wrapping material to the exterior of a completed bale, the cam comprising:

an insertion mechanism for directing the wrapping material from the dispenser into the bale forming chamber, said insertion mechanism selectively movable between a home position and a generally opposing insert position, and positionable at a pre-cut position located between said home and insert positions;

a knife mechanism for severing the wrapping material from the dispenser, said knife mechanism having at least a normal position and an armed position, movement from said armed position to said normal position severing the wrapping material; a spring connected to said knife mechanism, said spring providing a biasing force to move said knife mechanism from said armed position to said normal position; an elongate link member having generally opposing first and second ends, said first end connected to said knife mechanism;

a cam follower connected to said second end of said link member and constrained for bi-directional movement along a single axis; and an elongate groove cam disposed on the insertion mechanism for movement therewith, said groove cam comprising a first arming profile and a second arming profile, each configured to be serially engaged by said cam follower to coordinate movement of said knife mechanism with movement of said insertion mechanism wherein said first arming profile is configured to move said knife mechanism from said normal position toward said armed position at a first rate, said second arming profile is configured to move said knife mechanism moves toward said armed position at a second rate less than said first rate and increase the degree of pivotal movement of said insertion mechanism from said home position toward said insert position necessary to reposition said knife mechanism in said armed position.

11. The cam of claim 10, wherein said groove cam is generally L-shaped, said arming profile and said cutting profile are generally opposed to one another along a first leg of the L-shape, and said first and second stationary profiles are generally opposed to one another along a second leg of the L-shape.

12. The cam of claim 11, wherein said knife mechanism further comprises a rocker mechanism pivotally connected to the baler and movable between said armed position and said normal position, said spring biasing said rocker mechanism toward said normal position, said rocker mechanism being moved toward said armed position by movement of said cam follower along said arming profile to said insertion mechanism pre-cut position at which point said rocker mechanism is held stationary by an over-center arrangement in said pivotal connection to the baler, said rocker mechanism being released and allowed to move toward said normal position by engagement of said cam follower with said groove cam as said insertion mechanism is moved from said pre-cut position toward said home position.

* * * * *